United States Patent
Jiang

(10) Patent No.: US 11,064,385 B2
(45) Date of Patent: Jul. 13, 2021

(54) DATA TRANSMISSION METHOD AND APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/632,532

(22) PCT Filed: Sep. 27, 2017

(86) PCT No.: PCT/CN2017/103806
§ 371 (c)(1),
(2) Date: Jan. 20, 2020

(87) PCT Pub. No.: WO2019/015111
PCT Pub. Date: Jan. 24, 2019

(65) Prior Publication Data
US 2020/0205024 A1 Jun. 25, 2020

(30) Foreign Application Priority Data

Jul. 20, 2017 (WO) ............... PCT/CN2017/093734

(51) Int. Cl.
*H04W 28/02* (2009.01)
*H04W 76/15* (2018.01)
(Continued)

(52) U.S. Cl.
CPC ....... *H04W 28/0263* (2013.01); *H04L 1/0006* (2013.01); *H04L 1/1861* (2013.01);
(Continued)

(58) Field of Classification Search
CPC . H04W 28/0263; H04W 76/15; H04W 76/27; H04W 36/0027; H04W 36/08;
(Continued)

(56) References Cited

U.S. PATENT DOCUMENTS

| 2015/0215965 A1 | 7/2015 | Yamada |
| 2015/0327094 A1 | 11/2015 | Lee et al. |

(Continued)

FOREIGN PATENT DOCUMENTS

| CN | 101677266 A | 3/2010 |
| CN | 102868546 A | 1/2013 |

(Continued)

OTHER PUBLICATIONS

International Search Report of PCT Application No. PCT/CN2017/103806 dated Apr. 10, 2018 with English translation, (12p).
(Continued)

*Primary Examiner* — Afshawn M Towfighi
(74) *Attorney, Agent, or Firm* — Arch & Lake LLP

(57) ABSTRACT

A data transmission method comprises: determining whether a switched target Data Radio Bearer (DRB) supports sequential data transmission or not, when a DRB remapping event is detected during a data transmission process of a target data stream; in case that transmitting, through an original DRB, data packets in the target data stream that have been delivered to the original DRB, and transmitting, through the target DRB, data packets in the target data stream that have not been delivered to the original DRB, in case that the target DRB does not support sequential data transmission; and in case that transmitting data packets in the target data stream in a transmission mode in which sequence of data packets is not changed, in case that the target DRB supports sequential data transmission.

20 Claims, 8 Drawing Sheets

(51) Int. Cl.
*H04W 76/27* (2018.01)
*H04L 1/00* (2006.01)
*H04L 1/18* (2006.01)
*H04W 36/00* (2009.01)
*H04W 36/08* (2009.01)
*H04W 80/02* (2009.01)
*H04W 80/08* (2009.01)

(52) U.S. Cl.
CPC ....... *H04W 36/0027* (2013.01); *H04W 36/08* (2013.01); *H04W 76/15* (2018.02); *H04W 76/27* (2018.02); *H04W 80/02* (2013.01); *H04W 80/08* (2013.01)

(58) Field of Classification Search
CPC ..... H04W 80/02; H04W 80/08; H04W 28/02; H04W 36/00; H04L 1/0006; H04L 1/1861; H04L 47/34
See application file for complete search history.

(56) References Cited

U.S. PATENT DOCUMENTS

| 2017/0339568 | A1* | 11/2017 | Wang | H04W 72/082 |
| 2019/0246310 | A1* | 8/2019 | Han | H04W 28/04 |

FOREIGN PATENT DOCUMENTS

| CN | 103533586 | A | 1/2014 |
| CN | 103686894 | A | 3/2014 |
| CN | 103875275 | A | 6/2014 |
| CN | 104363598 | A | 2/2015 |
| CN | 104837162 | A | 8/2015 |
| CN | 104904254 | A | 9/2015 |
| EP | 3031290 | A1 | 6/2016 |
| WO | 2015021214 | A1 | 2/2012 |
| WO | 2015018653 | A1 | 2/2015 |
| WO | 2016082652 | A1 | 6/2016 |

OTHER PUBLICATIONS

International Search Report of PCT Application No. PCT/CN2017/093734 dated Apr. 8, 2018 with English translation (14p).
Media Tek Inc., "QoS Flow to DRB Remapping during Handover", R2-1704523, 3GPP TSG-RAN WG2 Meeting #98, May 19, 2017, (4p).
Catt, "QoS Re-mapping of QoS Flow and DRB", R2-1704266, 3GPP TSG-RAN WG2 Meeting #98, May 19, 2017, (3p).
Potevio, DRB mapping on Un. 3GPP TSG RAN WG2 #71, R2-104291, Aug. 27, 2010, (5p).
Nokia et al, UL DRB mapping, 3GPPTSG RANWG2 Meeting#96, R2-167668, Nov. 18, 2016, (4p).
International Search (including English translation) and Written Opinion issued in PCT/CN2017/103806, dated Apr. 10, 2018, (8p).
International Search (including English translation) and Written Opinion issued in PCT/CN2017/093734, dated Apr. 8, 2018, (8p).
Extended European Search Report of Counterpart EP Application No. 17918668.9 dated Aug. 10, 2020, (10p).
Huawei, "Lossless HO of QoS Flow", 3GPP Draft; R2-1704979 Lossless Handover of QoS Flow, 3rd Generation Partnership Project (3GPP), Mobile Competence Centre; 650, Route Des Lucioles ; F-06921 Sophia-Antipolis Cedex ; France, vol. RAN WG2, No. Hangzhou, China; May 15, 2017-May 19, 2017, May 6, 2017, (5p).
Huawei et al., "QoS Flow to DRB Re-Mapping", 3GPP Draft; R2-1706787 QoS Flow to DRB Re-Mapping, 3rd Generation Partnership Project (3GPP), Mobile Competence Centre; 650, Route Des Lucioles ; F-06921 Sophia-Antipolis Cedex ; France, vol. RAN WG2, No. Qingdao, China; Jun. 27, 2017-Jun. 29, 2017, Jun. 17, 2017, (6p).
Catt, "QoS Re-mapping of QoS Flow and DRB", 3GPP Draft; R2-1706382 QoS Remapping, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, Jun. 26, 2017, (4p).
LG Electronics Inc., "QoS Flow to DRB Remapping", 3GPP Draft; R2-1704552 QoS Flow to DRB Remapping, 3rd Generation Partnership Project (3GPP), Mobile Competence Centre; 650, Route Des Lucioles ; F-06921 Sophia-Antipolis Cedex; France, vol. RAN WG2, No. Hangzhou, China; May 15, 2017-May 19, 2017, May 4, 2017, (3p).
First Office Action of Chinese Application No. 201780001113.5 dated Mar. 29, 2021 with English translation, (13p).

* cited by examiner

DATA TRANSMISSION METHOD AND APPARATUS

CROSS-REFERENCES TO RELATED APPLICATIONS

This application is a National Stage of International Application No. PCT/CN2017/103806 filed on Sep. 27, 2017, which claims priority to PCT/CN2017/093734 filed on Jul. 20, 2017, the contents of all of which are incorporated herein by reference in their entirety.

TECHNICAL FIELD

The present disclosure relates to the field of communication technology, and more particularly, to a data transmission method and apparatus.

BACKGROUND

In the 5G (5th-Generation mobile communication) technology, the previous 4G (4th-Generation mobile communication) technology is still continued: the communication process is divided into a user plane and a control plane. The user plane mainly includes three layers from top to bottom, i.e., a PDCP (Packet Data Convergence Protocol) layer, an RLC (Radio Link Control) layer, and a MAC (Media Access Control) layer. With the in-depth study of 5G technology, in addition to the above three layers, a new layer, i.e., an SDAP (Service Data Adaptation Protocol) layer, is introduced over the PDCP layer. In the SDAP layer, an important task to be completed is to map a data packet to a Data Radio Bearer (DRB) (to allocate a DRB that transmits a data packet to the data packet) so as to transmit the data packet through the mapped DRB.

Generally, a plurality of data streams is transmitted in a session between a terminal and a base station, each data stream including a plurality of data packets. In the data transmission process of a data stream, a DRB remapping event occurs in some cases. That is, the mapping between a data packet in a target data stream and a DRB is switched from an original DRB to a target DRB. For example, as the terminal moves, the base station to which the terminal is connected changes. When the terminal is connected to a new base station, the new base station is likely to instruct the terminal to perform DRB remapping.

In case that a data packet in the target data stream is being transmitted when a DRB remapping event occurs, how to transmit the data packet in the target data stream is problematic. In the related art, the terminal will generally continue to transmit a data packet in a target data stream that has been delivered from an SDAP layer to an original DRB before a DRB remapping event occurs, and deliver a data packet in the target data stream that has not been delivered from the SDAP layer to the original DRB to the target DRB to be transmitted. However, there is still a problem in that, because there is a difference in time to transmit data packets by different DRBs, the data packet first delivered to the DRB is not necessarily received first.

In order to solve the above problem, in the related art, data packets can be transmitted in a transmission mode in which sequence of data packets is not changed. The specific processing manner may be as follows: the terminal will transmit all data packets in the target data stream that need to be transmitted before the DRB remapping event occurs through the original DRB, and then transmit data packets in a new data stream through the target DRB. In case that the data packets can be transmitted in sequence, the workload of sorting these data packets by the base station in the case of receiving the data packets can be alleviated.

In the process of implementing the present disclosure, the inventors have found at least the following problems.

When a DRB remapping event occurs, the data packet transmission cannot be immediately switched from the original DRB to the target DRB in the above manner, so it is necessary to wait for all the data packets in the target data stream to be transmitted through the original DRB, and then data packets in a new data stream are transmitted through the target DRB. In this case, the terminal cannot immediately follow a remapping indication from the base station, thereby reducing the communication quality.

In addition, some DRBs do not transmit data packets in a sequence that these data packets should arrive. That is, the DRBs do not support sequential data transmission. Even if the sequence of data packets delivered to these DRBs is controlled, these DRBs may not transmit the data packets in sequence. Meanwhile, when the original DRB generally does not support sequential data transmission, the target DRB does not support sequential data transmission either. In this case, the data packets in a new data stream may be transmitted through the target DRB, without the need to wait for the original DRB that does not support sequential data packet transmission to transmit all the data packets in the target data stream. In doing so, the effect of the data packets arriving in sequence is not achieved at the expense of reduced communication quality.

SUMMARY

Embodiments of the present disclosure provide a data transmission method and apparatus. The technical solutions are as follows.

In the first aspect, there is provided a data transmission method. The method comprises the following steps:

determining whether a switched target DRB supports sequential data transmission or not, when a DRB remapping event is detected during a data transmission process of a target data stream;

in case that transmitting data packets in the target data stream that have been delivered to the original DRB through an original DRB, and transmitting data packets in the target data stream that have not been delivered to the original DRB through the target DRB, in case that the target DRB does not support sequential data transmission; and in case that transmitting data packets in the target data stream in a transmission mode in which sequence of data packets is not changed, in case that the target DRB supports sequential data transmission.

Compared with the prior art, the DRB that supports the sequential data transmission can improve the communication quality while ensuring the transmission sequence of data packets.

The technical solutions provided by the embodiments of the present disclosure have the following beneficial effects:

according to the method provided by the embodiment of the present disclosure, compared with the prior art, with respect to a DRB that does not support sequential data transmission, the data packets in the target data stream that have been delivered to the original DRB can be transmitted through the original DRB, and the data packets in the target data stream that have not been delivered to the original DRB can be transmitted through the target DRB. In this process, after the base station indicates that the DRB is switched, the terminal can switch the DRB in time, so that the communication quality can be ensured. With respect to a DRB that supports sequential data transmission, the data packets in the target data stream can be transmitted in a transmission mode in which sequence of data packets is not changed. Compared with the prior art, the above solutions can improve the communication quality while ensuring the data packet transmission sequence for the DRB that supports sequential data transmission.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure will be described in further detail with reference to the accompanying drawings, to present the objects, technical solutions, and advantages of the present disclosure more clearly.

An embodiment of the present disclosure provides a data transmission method. The method can be implemented by the cooperation of a transmitting end and a receiving end. The transmitting end and the receiving end may be a terminal or a base station respectively. According to a data transmission direction, such as an uplink direction or a downlink direction, the roles of the terminal and the base station as the transmitting end and the receiving end may be interchangeable. Since the roles of the terminal and the base station as the transmitting end and the receiving end may be interchangeable, there are two entities in a communication infrastructure of each of the transmitting ends in the terminal and the base station, one entity being used for transmitting data, and the other entity being used for receiving data. For convenience of description, the terminal will be hereinafter described as a transmitting end, and the base station will be hereinafter described as a receiving end, and vice versa. The terminal acting as a transmitting end operates as the entity for transmitting data, and the base station acting as a receiving end operates as the entity for receiving data.

The terminal may be a mobile phone, a tablet PC, or the like. The terminal may include components such as a transceiver, a processor and a memory. The transceiver may be used for performing data transmission with a server, for example, transmitting log files to the server. The transceiver may include a Bluetooth component, a WiFi (Wireless-Fidelity) component, an antenna, a matching circuit, a modem, and the like. The processor may be a CPU (Central Processing Unit) or the like, and may be used to transmit, through an original DRB, data packets in a target data stream that have been delivered to the original DRB, and transmit, through the target DRB, data packets in the target data stream that have not been delivered to the original DRB in the case where a target DRB does not support sequential data transmission, so as to be processed. The memory may be a RAM (Random Access Memory), a Flash (flash memory), or the like, and may be used to store received data, data required during processing, data generated during processing, and the like, such as data packets in a target data stream.

The terminal may also include an input component, a display component, an audio output component, and the like. The input component may be a touch screen, a keyboard, a mouse, or the like. The audio output component may be a speaker, a headphone, or the like.

Figure 1:
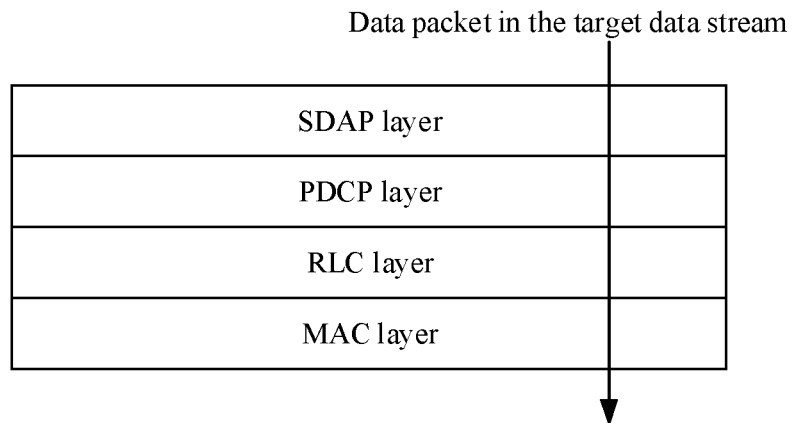
FIG. 1 is a schematic diagram showing a communication infrastructure of a transmitting end provided by an embodiment of the present disclosure.

It should be noted that, as shown in FIG. 1, in the 5G technology, the layers included in a communication infrastructure include an SDAP layer, a PDCP layer, an RLC layer, and an MAC layer in sequence from top to bottom. When the terminal establishes a session with the base station, a plurality of data streams may be transmitted during the session. Each data stream may include a plurality of data packets which are delivered in sequence from top to bottom in the communication infrastructure of the terminal until these data packets are transmitted to the base station through the last layer. These data packets exist in the terminal in a form of data streams before being split into data packets. The SDAP layer may allocate DRBs that transmit these data streams for these data streams. After the SDAP layer allocates the DRBs for these data streams, the data streams will be delivered to the lower layers in a form of data packets. In the course of initial allocation, the DRBs to which the same data streams are allocated are the same In actual transmission, there are a plurality of DRBs. Each of the PDCP layer, the RLC layer and the MAC layer has submodules that support respective DRBs respectively. Each submodule may be a virtual software module. When each layer receives data packets delivered from the upper layer, these data packets will be allocated in the corresponding submodules in each layer that support the DRBs corresponding to the data packets so as to be processed.

In addition, the base station uniformly manages a mapping relationship between a data stream and a DRB. After the base station determines the mapping relationship between a data stream and a DRB, RRC (Radio Resource Control) information may be generated in the mapping relationship between the data stream and the DRB, and is transmitted to a target terminal. After receiving the RRC information, the target terminal may instruct the SDAP layer to perform DRB allocation on the data stream according to the mapping relationship between the data stream and the DRB in the RRC information. In addition to uniformly managing the mapping relationships between the data streams and the corresponding DRBs, the base station may also set whether each DRB is activated to support a sequential delivery function, and transmit, together with the RRC information, information indicating whether each DRB is activated to support the sequential delivery function to the target terminal. After receiving the RRC information, the target terminal may configure the respective DRBs.

Figure 2:
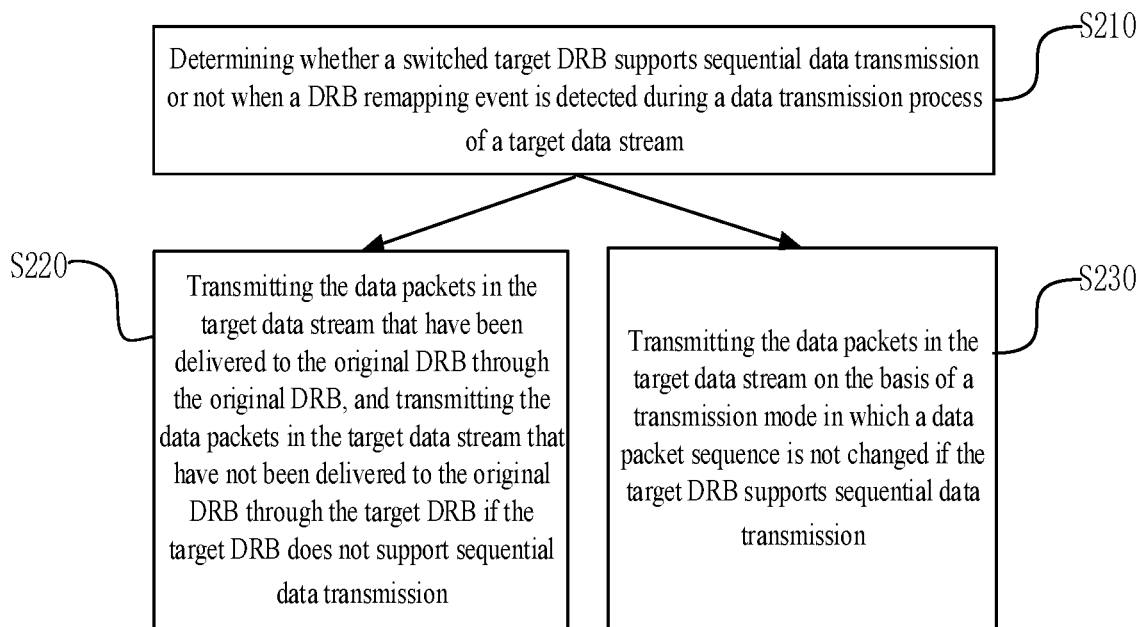
FIG. 2 is a flowchart of a data transmission method provided by an embodiment of the present disclosure.

FIG. 2 is a flowchart of a data transmission method provided by an embodiment of the present disclosure. Referring to FIG. 2, the method comprises the following steps.

In step S210, when a DRB remapping event is detected during a data transmission process of a target data stream, whether a switched target DRB supports sequential data transmission or not is determined.

A plurality of data streams is transmitted in a session between the terminal and the base station, each data stream including a plurality of data packets. In the data transmission process of a data stream, in some cases, a DRB remapping event will occur, that is, the mapping between data packets in a target data stream and a DRB is switched from the original DRB to the target DRB. In this way, the data packets in the target data stream are allocated to the target DRB, rather than the original DRB, and are transmitted to the base station through resources of the target DRB. Whether to perform DRB remapping is indicated in the RRC information transmitted by the base station to the terminal. Alternatively, the terminal may be instructed to perform DRB remapping in a form of a user plane. For example, the base station adds indication information for performing DRB remapping into a packet header of a data packet that can be interpreted by the SDAP layer in the terminal.

With respect to the data packets, each layer of data packets contains two data packet forms, i.e., an SDU (Service Data Unit) and a PDU (Packet Data Unit). When PDUs of the previous layer are delivered to the next layer, they will be used as SUDs of the next layer. In the present embodiment of the present disclosure, the SDUs and PDUs of each layer are collectively referred to as data packets.

In addition, some DRBs do not transmit data packets in a sequence in which these data packets should arrive. That is, the DRBs do not support sequential data transmission. Even in case that the sequence of the data packets delivered to these DRBs is controlled, these DRBs may not transmit the data packets in sequence. Before the target DRB is switched, it is first determined whether the target DRB supports sequential data transmission.

In step S220, in case that the target DRB does not support sequential data transmission, the data packets in the target data stream that have been delivered to the original DRB are transmitted through the original DRB, and the data packets in the target data stream that have not been delivered to the original DRB are transmitted through the target DRB.

Figure 3:
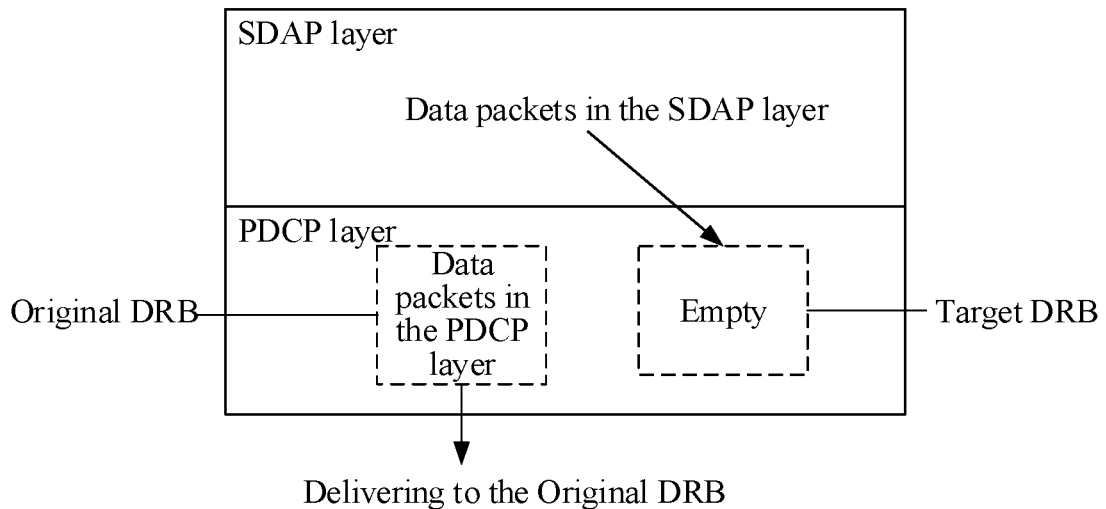
FIG. 3 is a flowchart of a data transmission method provided by an embodiment of the present disclosure.

In the course of implementation, as shown in FIG. 3, in case that the target DRB does not support sequential data transmission, when a DRB remapping event is detected during the data transmission process of the target data stream, a part of data packets in the target data stream has been delivered from the SDAP layer to the PDCP layer corresponding to the original DRB, and the data packets that have been delivered may be transmitted through the original DRB. In addition, the remaining part of the data packets in the target data stream are still in the SDAP layer, without being delivered to the PDCP layer corresponding to the original DRB. These data packets may be then delivered from the SDAP layer to the PDCP layer corresponding to the target DRB. The data packets that have not been delivered to the original DRB are transmitted through the target DRB. In the step S220, since the target DRB does not support sequential data transmission, there is no need to deliberately control the transmission timing of the data packets in the target data stream.

In step S230, in case that the target DRB supports sequential data transmission, the data packets in the target data stream are transmitted in a transmission mode in which sequence of data packets is not changed.

Optionally, the step S220 may include: in case that the target DRB does not support sequential data transmission, instructing, through the SDAP layer or the RRC layer, the PDCP layer and the RLC layer to perform a step of transmitting, through the original DRB, the data packets in the target data stream that have been delivered to the original DRB; and transmitting, through the target DRB, the data packets in the target data stream that have not been delivered to the original DRB. The step S230 may include: in case that the target DRB supports sequential data transmission, instructing, through the SDAP layer or the RRC layer, the PDCP layer and the RLC layer to perform a step of transmitting the data packets in the target data stream in a transmission mode in which sequence of data packets is not changed.

In the course of implementation, it may be set in advance that the PDCP layer and the RLC layer are instructed by either the SDAP layer or the RRC layer to perform the corresponding switching action when the DRB remapping event occurs. After setting, the PDCP layer and the RLC layer are instructed by the set layer to perform the corresponding switching action when the DRB remapping event occurs.

It should be noted that, in the embodiments of the present disclosure, four transmission modes in which sequence of data packets is not changed are provided to transmit the data packets in the target data stream. Of course, there are actually other transmission modes in which sequence of data packets is not changed, which are not exemplified here.

In the first mode: the data packets in the target data stream are stopped from being delivered to the original DRB, and when it is determined that the data packets in the target data stream that have been delivered to the original DRB are successfully transmitted to a receiving end, data packets in the target data stream that have not been delivered to the original DRB are transmitted through the target DRB.

Figure 4:
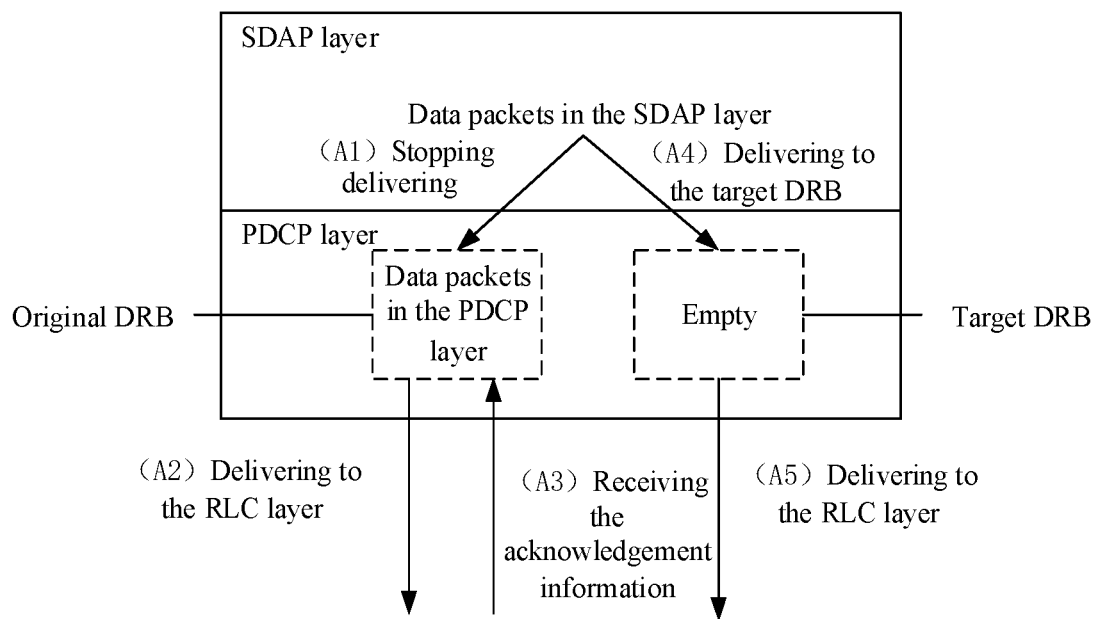
FIG. 4 is a flowchart of a data transmission method provided by an embodiment of the present disclosure.

In the course of implementation, as shown in FIG. 4, in case that the target DRB supports sequential data transmission, when the DRB remapping event is detected in the data transmission process of the target data stream, it is first to determine (A1): stopping delivering the data packets in the SDAP layer to the original DRB. Next, it proceeds to execute (A2): delivering data packets at the PDCP layer corresponding to the original DRB to the RLC layer, and waiting for the data packets at the PDCP layer corresponding to the original DRB to be successfully transmitted to the base station through the RLC layer, wherein the base station may feed back acknowledgement information indicating that the data packets are successfully transmitted to the terminal. It proceeds to execute (A3): receiving the acknowledgement information by the terminal to determine that the data packets in the target data stream that have been delivered to the original DRB are successfully transmitted to the base station. It proceeds to execute (A4): delivering data packets in the target data stream that are in the SDAP layer and not delivered to the lower layer to the PDCP layer corresponding to the target DRB. It is finally to execute (A5): delivering data packets in the target data stream of the PDCP layer corresponding to the target DRB to the RLC layer corresponding to the target DRB until the data packets in the target data stream are transmitted from the terminal.

The second and third modes based on a transmission mode in which sequence of data packets is not changed will be introduced below. The second and third modes may be used as two independent schemes or as two related schemes. In case that the second and third modes are used as two independent schemes, only one of the execution modes 2 and 3 may be set in the terminal. In case that the second and third modes are used as two related schemes, a judgment condition may be added to determine whether the terminal is in a transmission feedback determination mode or a non-transmission feedback determination mode. The second mode is executed when the terminal is in the transmission feedback determination mode. The third mode is executed the terminal is in the non-transmission feedback determination mode. The second and third modes will be described in detail below.

In the second mode: in the transmission feedback determination mode, the acknowledgement information corresponding to the successfully transmitted data packets fed back by the receiving end is received, the data packets in the target data stream that have been successfully transmitted to the receiving end are determined according to the acknowledgement information, and other data packets in the target data stream other than the data packets that have been successfully transmitted to the receiving end are transmitted through the target DRB. The transmission feedback determination mode indicates that the receiving end will feed back the acknowledgement information when the data packets are successfully transmitted to the receiving end.

In the course of implementation, with respect to the RLC layer, there are two operation modes, one operation mode being an AM (Acknowledge Mode) and the other being UM (Unacknowledged Mode). When the RLC layer is in the AM, the RLC layer may receive the acknowledgement information corresponding to the successfully transmitted data packets fed back by the base station. Information indicating that the data packets have been successfully transmitted and information indicating which data packets have been successfully transmitted are present in the acknowledgement information. When receiving the acknowledgment information, the RLC layer may parse the acknowledgment information and deliver the parsed notification to the PDCP layer and the SDAP layer, such that the PDCP layer and the SDAP layer can determine which data packets have been successfully transmitted to the base station.

Optionally, the second mode may include the following operation steps: determining, through the RLC layer, data packets in the target data stream that have been delivered to the RLC layer and have not been successfully transmitted to the receiving end; determining, through the PDCP layer, data packets in the target data stream that have been delivered to the PDCP layer and have not been delivered to the RLC layer; and transmitting, through the target DRB, data packets that have been delivered to the RLC layer and have not been successfully transmitted to the receiving end, data packets in the target data stream that have been delivered to the PDCP layer and have not been delivered to the RLC layer, and data packets in the target data stream that have not been delivered to the original DRB.

Figure 5A:
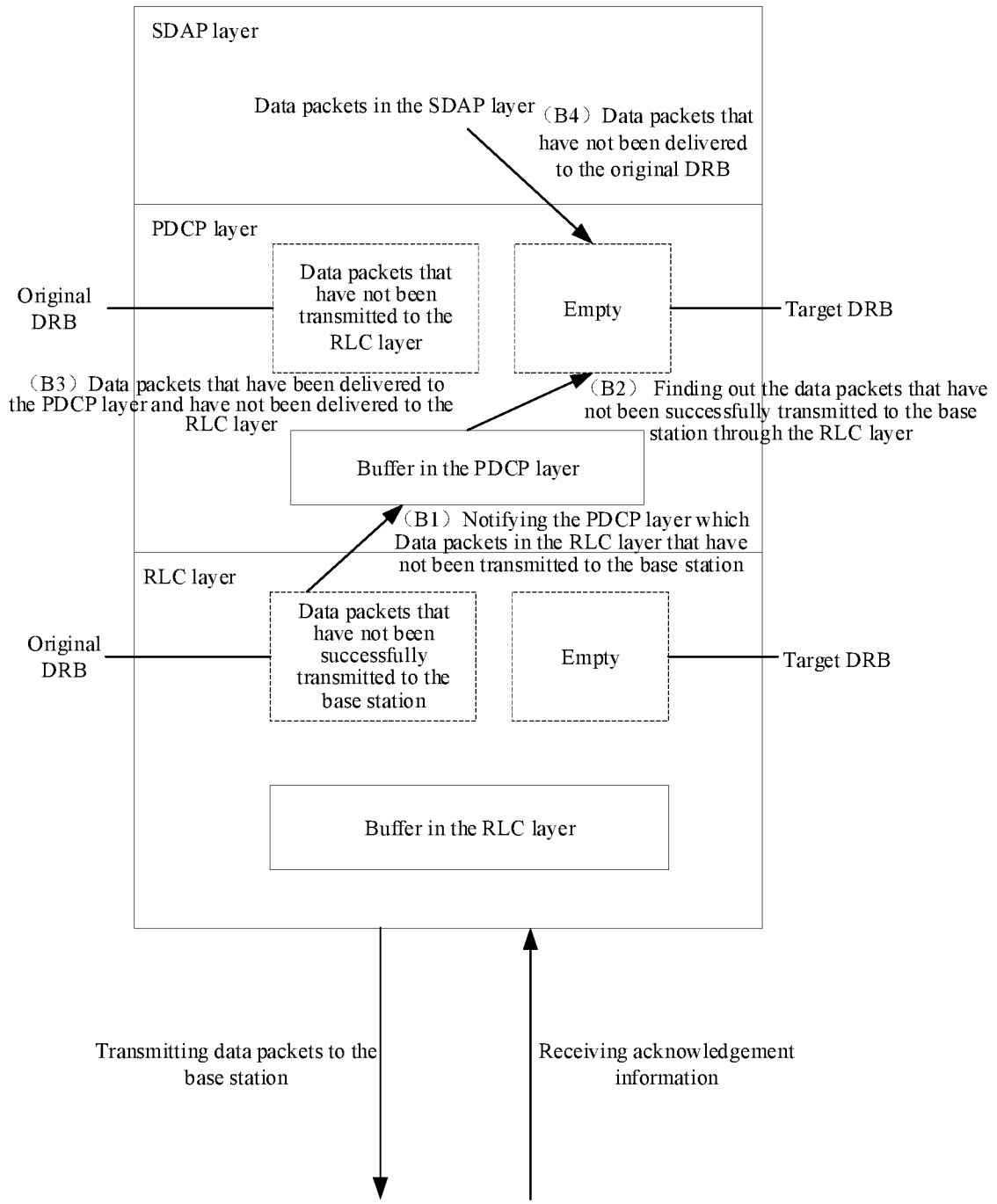
FIG. 5A is a flowchart of a data transmission method provided by an embodiment of the present disclosure.

In the course of implementation, since the target data stream is encapsulated in respective layers in sequence during the transmission process and delivered to the next layer, the target data stream may already exist in each layer in a session. When a DRB remapping event is detected during the data transmission of the target data stream, with respect to the target data stream in each layer, the data packets in the target data stream that have been successfully transmitted to the base station are first determined through the RLC layer. Then, the data packets in the target data stream that have been delivered to the PDCP layer and have not been successfully transmitted to the base station are determined through the PDCP layer. It should be noted that there is a corresponding buffer space for each layer to temporarily store the delivered and undelivered data packets. In the RLC layer corresponding to the original DRB, there are two parts of data packets correspondingly. The first part refers to the data packets that have been successfully transmitted to the base station, and these data packets may be confirmed by the acknowledgement information returned by the base station. The second part refers to the data packets that have not been successfully transmitted to the base station. As shown in FIG. 5A, it is possible to notify the PDCP layer which data packets that have not been successfully transmitted to the base station through the RLC layer (B1). In a buffer corresponding to the PDCP layer, there are data packets that have been delivered to the RLC layer, and the data packets that have not been successfully transmitted to the base station through the RLC layer may be found out from the buffer corresponding to the PDCP layer, and then delivered to the PDCP layer corresponding to the target DRB (B2). There is still a part of data packets that have not been delivered to the RLC layer at the PDCP layer corresponding to the original DRB. These data packets are confirmed, then found out from the buffer corresponding to the PDCP layer and delivered to the PDCP layer corresponding to the target DRB (B3). The data packets that have not been delivered to the original DRB in the SDAP layer are delivered to the PDCP layer corresponding to the target DRB (B4). Finally, the data packets that have been delivered to the RLC layer and have not been successfully transmitted to the base station, the data packets that have been delivered to the PDCP layer and have not been successfully transmitted to the base station, and the data packets in the target data stream that have not been delivered to the original DRB are transmitted through the target DRB.

Optionally, the method provided by the present embodiment further includes: deleting the data packets in the target data stream in the original DRB that have been delivered to the PDCP layer and have not been delivered to the RLC layer; and deleting the data packets in the target data stream in the original DRB that have been delivered to the RLC layer and have not been transmitted to the receiving end.

In the course of implementation, the forms of data packets existing in the SDAP layer, the PDCP layer, and the RLC layer are different. As for the PDCP layer, there are PDCP SDU data packets, PDCP SDU data packets that have been associated to PDCP PDU, and PDCP SDU data packets that have been delivered to the RLC layer and have been associated to the PDCP PDU. In the second mode, in the transmission feedback determination mode, the data packets that have been delivered to the RLC layer and have not been successfully transmitted to the receiving end of the base station, the data packets in the target data stream that have been delivered to the PDCP layer and have not been delivered to the RLC layer and the data packets in the target data stream that have not been delivered to the original DRB are transmitted through the target DRB. With respect to those data packets that have been delivered to the original DRB at the PDCP layer, the data packets can be deleted regardless of their forms. For example, the PDCP SDU data packets, and the PDCP SDU data packets that have been associated to the PDCP PDU are deleted, or the PDCP SDU data packets that have been delivered to the RLC layer and have been associated to the PDCP PDU may be deleted at the same time. Similarly, with respect to the RLC layer, the data packets in the RLC layer can also be deleted.

In the third mode: in a non-transmission feedback determination mode, other data packets in the target data stream other than the data packets that have been sent to the base station are transmitted through the target DRB, wherein the non-transmission feedback determination mode indicates that the base station does not feed back acknowledgement information when the data packets are successfully transmitted to the base station.

Optionally, the third mode may include the following operation steps: determining, through the RLC layer, data packets in the target data stream that have been delivered to the RLC layer and have not been transmitted to the receiving end; determining, through the PDCP layer, data packets in the target data stream that have been delivered to the PDCP layer and have not been delivered to the RLC layer; and transmitting, through the target DRB, data packets that have been delivered to the RLC layer and have not been transmitted to the receiving end, data packets that have been delivered to the PDCP layer and have not been delivered to the RLC layer, and data packets in the target data stream that have not been delivered to the original DRB.

Figure 5B:
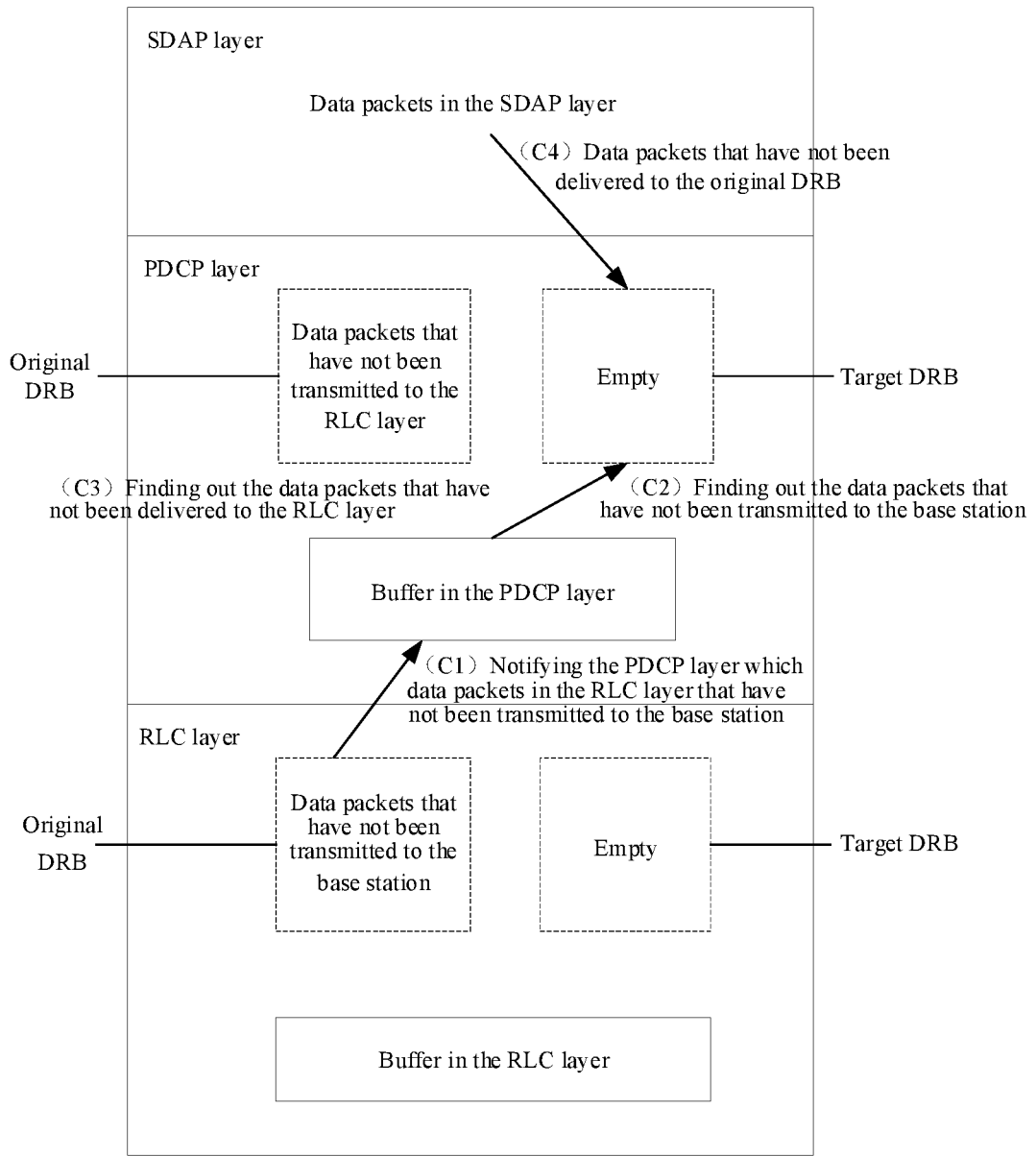
FIG. 5B is a flowchart of a data transmission method provided by an embodiment of the present disclosure.

In the course of implementation, when a DRB remapping event is detected during the data transmission of the target data stream, with respect to the target data stream in each layer, the data packets in the target data stream that have been delivered to the RLC layer and have not been transmitted to the base station are first determined through the RLC layer. Then, data packets in the target data stream that have been delivered to the PDCP layer and have not been delivered to the RLC layer are determined through the PDCP layer. In the RLC layer corresponding to the original DRB, there are two parts of data packets correspondingly. The first part refers to the data packets that have been successfully transmitted to the base station. The second part refers to the data packets that have not been transmitted to the base station. As shown in FIG. 5B, the PDCP layer is notified of which data packets that have not been transmitted to the base station through the RLC layer (C1). In a buffer corresponding to the PDCP layer, there are data packets that have been delivered to the RLC layer, and these data packets that have not been transmitted to the base station through the RLC layer may be found out from the buffer corresponding to the PDCP layer, and then delivered to the PDCP layer corresponding to the target DRB (C2). There is still a part of data packets that have not been delivered to the RLC layer at the PDCP layer corresponding to the original DRB. These data packets are confirmed, then found out from the buffer corresponding to the PDCP layer and delivered to the PDCP layer corresponding to the target DRB (C3). The data packets that have not been delivered to the original DRB in the SDAP layer are delivered to the PDCP layer corresponding to the target DRB (C4). Finally, the data packets that have been delivered to the RLC layer and have not been transmitted to the base station, the data packets that have been delivered to the PDCP layer and have not been transmitted to the RLC layer, and the data packets in the target data stream that have not been delivered to the original DRB are transmitted through the target DRB. Optionally, it is also possible to delete the data packets in the target data stream that have not been delivered to the RLC layer and have been transmitted to the base station after these data packets are determined, so as to prevent the these packets from being transmitted repeatedly through the original DRB and the target DRB respectively.

Optionally, the method provided by the present embodiment further includes: deleting the data packets in the target data stream in the original DRB that have been delivered to the PDCP layer and have not been delivered to the RLC layer; and deleting the data packets in the original DRB that have been delivered to the RLC layer and have not been transmitted to the receiving end.

Similar to the second mode, in the course of implementation, as for the PDCP layer, there are PDCP SDU data packets, PDCP SDU data packets that have been associated to PDCP PDU, and PDCP SDU data packets that have been delivered to the RLC layer and have been associated to the PDCP PDU. In the third mode, in the non-transmission feedback determination mode, the data packets that have been delivered to the RLC layer and have not been successfully transmitted to the receiving end of the base station, the data packets in the target data stream that have been delivered to the PDCP layer and have not been delivered to the RLC layer and the data packets in the target data stream that have not been delivered to the original DRB are transmitted through the target DRB. With respect to those data packets that have been delivered to the original DRB at the PDCP layer, these data packets can be deleted regardless of their forms. For example, the PDCP SDU data packets and the PDCP SDU data packets that have been associated to PDCP PDU are deleted, or the PDCP SDU data packets that have been delivered to the RLC layer and have been associated to the PDCP PDU may be deleted at the same time. For the same reason as the RLC layer, the data packets in the RLC layer can also be deleted.

Optionally, the method provided by the present embodiment further includes: transmitting serial numbers of the data packets deleted in the original DRB to the receiving ends, such that the original DRB at the receiving end stops waiting for receiving data packets corresponding to the serial numbers.

In the course of implementation, with respect to the original DRB at the receiving end, there is a resequencing timer for timing reception of scrambled data packets. In case that the data packets are deleted from the original DRB at the transmitting end, and the original DRB at the receiving end does not know that these data packets have been deleted, a timer will always be started when these deleted data packets are received, and these deleted data packets will be discarded after time is out. Therefore, the resequencing efficiency is reduced. Therefore, the transmitting end may transmit the serial numbers of the deleted data packets, such as SN numbers, to the receiving end, so as to notify the receiving end that the timer is not required to start to wait for receiving the deleted data packets. Therefore, the resequencing efficiency of the receiving end can be improved.

Optionally, the transmitting the data packets in the target data stream in a transmission mode in which sequence of data packets is not changed may include: stopping delivering the data packets in the target data stream to the original DRB; determining SDU (Service Data Unit) data packets in the target data stream at the PDCP layer that have not been delivered to the RLC layer; and when it is determined that the data packets in the target data stream other than the SDU data packets that have been delivered to the original DRB have been successfully transmitted to the receiving end, transmitting, through the target DRB, the SDU data packets, and the data packets in the target data stream that have not been delivered to the original DRB.

Figure 6:
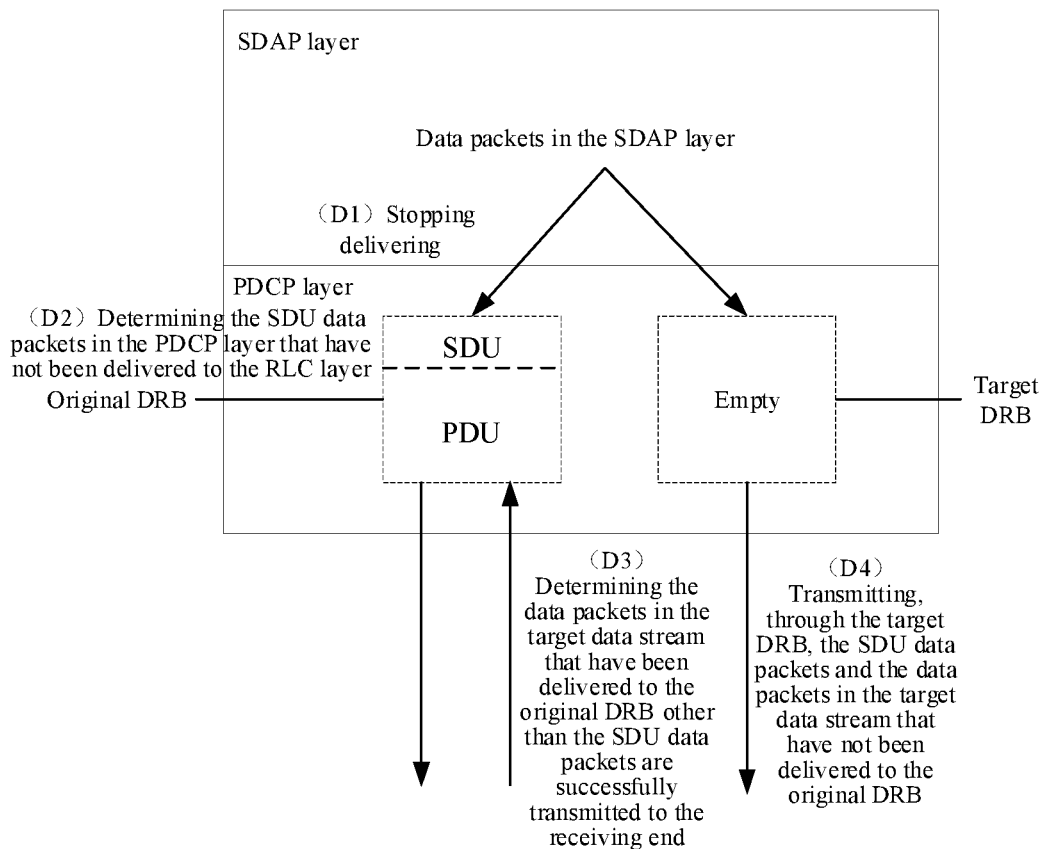
FIG. 6. is a flowchart of a data transmission method provided by an embodiment of the present disclosure.

The above mode can be used as the fourth mode. As shown in FIG. 6, it is first to execute (D1): stopping delivering the data packets in the target data stream to the original DRB. Next, it proceeds to execute (D2): determining the SDU data packets in the target data stream at the PDCP layer that have not been delivered to the RLC layer. With respect to the PDCP layer, there are PDCP SDU data packets, PDCP SDU data packets that have been associated to the PDCP PDU, and PDCP SDU data packets that have been delivered to the RLC layer and have been associated to the PDCP PDU. Here, the SDU data packets in the above data packets are determined. When it is determined that the data packets (the PDCP SDU data packets that have been associated to the PDCP PDU, and the PDCP SDU data packets that have been delivered to the RLC layer and have been associated to the PDCP PDU) in the target data stream that have been delivered to the original DRB other than the SDU data packets are successfully transmitted to the receiving end (D3), it proceeds to execute (D4): transmitting, through the original DRB, the SDU data packets and the data packets in the target data stream that have not been delivered to the original DRB, and deleting the SDU data packets in the original DRB.

Optionally, whether the DRB remapping event occurs during the data transmission process of the target data stream is detected by the SDAP layer or the RRC layer.

In the course of implementation, the DRB remapping event is detected from one of the above two layers during the data transmission process of the target data stream, an instruction to switch the original DRB to the target DRB is transmitted to their lower layers, so that their lower layers perform corresponding switching actions.

According to the method provided by the present embodiment of the present disclosure, compared with the prior art, with respect to a DRB that does not support sequential data transmission, the data packets in the target data stream that have been delivered to the original DRB can be transmitted through the original DRB, and the data packets in the target data stream that have not been delivered to the original DRB can be transmitted through the target DRB. In this process, after the receiving end indicates that the DRB is switched, the terminal can switch the DRB in time, so that the communication quality can be ensured. With respect to a DRB that supports sequential data transmission, the data packets in the target data stream can be transmitted in a transmission mode in which sequence of data packets is not changed. Compared with the prior art, the above solutions can improve the communication quality while ensuring the data packet transmission sequence for the DRB that supports sequential data transmission.

Figure 7:
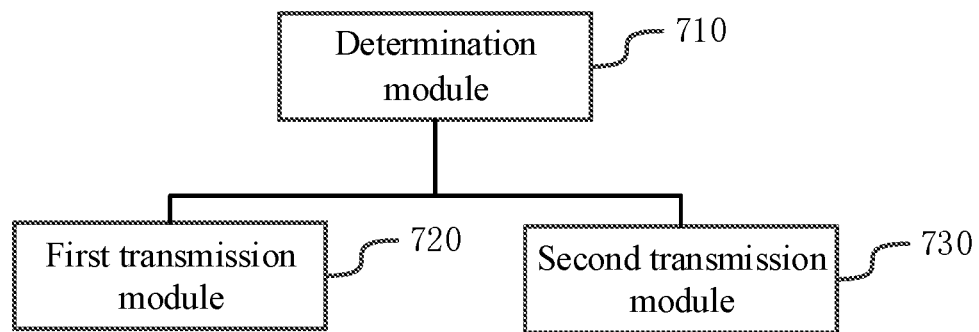
FIG. 7 is a schematic structural diagram of a data transmission apparatus provided by an embodiment of the present disclosure.

FIG. 7 is a schematic structural diagram of a data transmission apparatus provided by an embodiment of the present disclosure. Referring to FIG. 7, the apparatus includes:

a determination module 710 configured to, when a DRB remapping event is detected during a data transmission process of a target data stream, determine whether a switched target DRB supports sequential data transmission or not;

a first transmission module 720, configured to, when the target DRB does not support sequential data transmission, transmit, through the original DRB, data packets in the target data stream that have been delivered to the original DRB; and transmit, through the target DRB, data packets in the target data stream that have not been delivered to the original DRB; and a second transmission module 730 configured to, when the target DRB supports sequential data transmission, transmit data packets in the target data stream in a transmission mode in which sequence of data packets is not changed.

Optionally, the second transmission module 730 is configured to stop delivering the data packets in the target data stream to the original DRB; and when it is determined that the data packets in the target data stream that have been delivered to the original DRB are successfully transmitted to a receiving end, transmit, through the target DRB, data packets in the target data stream that have not been delivered to the original DRB.

Optionally, the second transmission module 730 is configured to, in a transmission feedback determination mode, receive acknowledgement information corresponding to the successfully transmitted data packets fed back by the receiving end; determine, according to the acknowledgement information, data packets in the target data stream that have been successfully transmitted to the receiving end; and transmit, through the target DRB, other data packets in the target data stream other than the data packets that have been successfully transmitted to the receiving end, wherein the transmission feedback determination mode indicates that the receiving end feeds back the acknowledgement information when the data packets are successfully transmitted to the receiving end.

Figure 8:
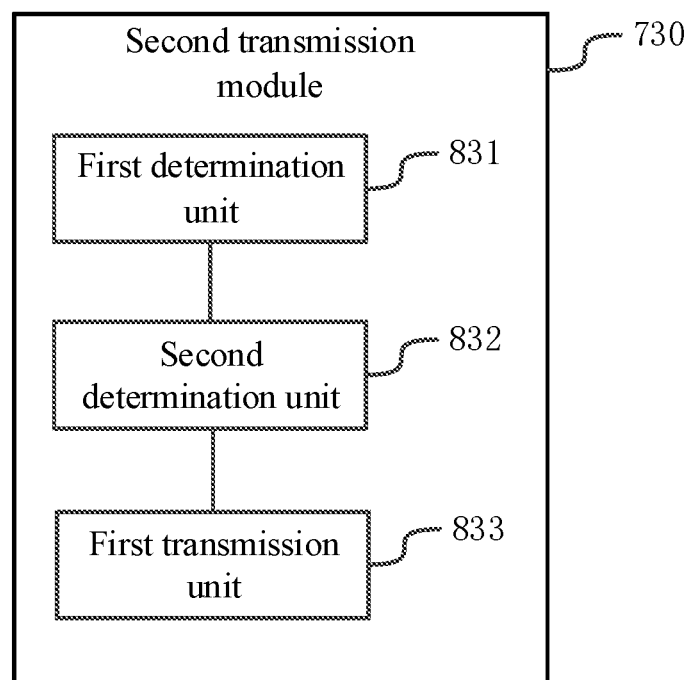
FIG. 8 is a schematic structural diagram of a data transmission apparatus provided by an embodiment of the present disclosure.

Optionally, the second transmission module 730 as shown in FIG. 8 includes:

a first determination unit 831 configured to determine, through an RLC layer, data packets in the target data stream that have been delivered to the RLC layer and have not been successfully transmitted to the receiving end;

a second determination unit 832 configured to determine, through a PDCP layer, data packets in the target data stream that have been delivered to the PDCP layer and have not been delivered to the RLC layer; and a first transmission unit 833 configured to transmit, through the target DRB, the data packets that have been delivered to the RLC layer and have not been successfully transmitted to the receiving end, the data packets that have been delivered to the PDCP layer and have not been successfully transmitted to the receiving end, and the data packets in the target data stream that have not been delivered to the original DRB.

Optionally, the apparatus further includes:

a first deletion module configured to delete the data packets in the target data stream in the original DRB that have been delivered to the PDCP layer and have not been delivered to the RLC layer; and delete the data packets in the target data stream in the original DRB that have been delivered to the RLC layer and have not been successfully transmitted to the receiving end.

Optionally, the second transmission module 730 is configured to, in a non-transmission feedback determination mode, transmit, through the target DRB, other data packets in the target data stream other than the data packets that have been transmitted to the receiving end, wherein the non-transmission feedback determination mode indicates that the receiving end does not feed back the acknowledgement information when the data packets are successfully transmitted to the receiving end.

Figure 9:
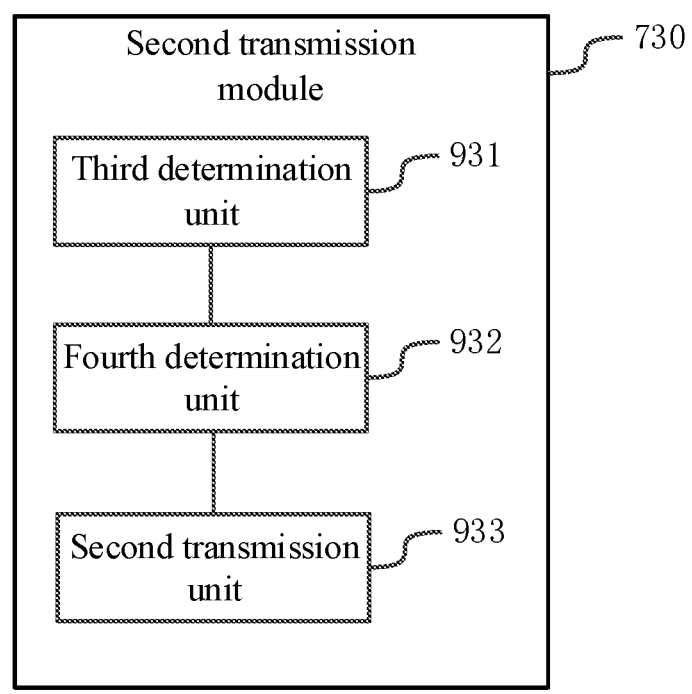
FIG. 9 is a schematic structural diagram of a data transmission apparatus provided by an embodiment of the present disclosure.

Optionally, as shown in FIG. 9, the second transmission module 730 includes:

a third determination unit 931 configured to determine, through the RLC layer, data packets in the target data stream that have been delivered to the RLC layer and have not been transmitted to the receiving end;

a fourth determination unit 932 configured to determine, through the PDCP layer, data packets in the target data stream that have been delivered to the PDCP layer and have not been delivered to the RLC layer; and a second transmission unit 933 configured to transmit, through the target DRB, the data packets that have been delivered to the RLC layer and have not been transmitted to the receiving end, the data packets that have been delivered to the PDCP layer and have not been delivered to the RLC layer and the data packets in the target data stream that have not been delivered to the original DRB.

Optionally, the apparatus further includes:

a second deletion module configured to delete the data packets in the target data stream in the original DRB that have been delivered to the PDCP layer and have not been delivered to the RLC layer; and delete the data packets in the original DRB that have been delivered to the RLC layer and have not been transmitted to the receiving end.

Optionally, the apparatus further includes:

a transmission module configured to transmit serial numbers of the data packets deleted in the original DRB to the receiving end, such that the original DRB at the receiving end stops waiting for receiving the data packets corresponding to the serial numbers.

Optionally, the second transmission module 730 includes:

a stop unit configured to stop delivering data packets in the target data stream to the original DRB;

a fifth determination unit configured to determine SDU data packets in the target data stream at the PDCP layer that have not been delivered to the RLC layer; and a third transmission unit configured to, when it is determined that the data packets in the target data stream that have been delivered to the original DRB other than the SDU data packets are successfully transmitted to the receiving end, transmit, through the target DRB, the SDU data packets, and the data packets in the target data stream that have not been delivered to the original DRB.

Optionally, whether the DRB remapping event occurs during the data transmission process of the target data stream is detected by the SDAP layer or the RRC layer.

Optionally, the first transmission module 720 is configured to, when the target DRB does not support sequential data transmission, instruct, through the SDAP layer or the RRC layer, the PDCP layer and the RLC layer to perform a step of: transmitting, through the original DRB, the data packets in the target data stream that have been delivered to the original DRB, and transmitting, through the target DRB, the data packets in the target data stream that have not been delivered to the original DRB. The second transmission module 730 is configured to, when the target DRB supports sequential data transmission, instruct, through the SDAP layer or the RRC layer, the PDCP layer and the RLC layer to perform a step of: transmitting the data packets in the target data stream in a transmission mode in which sequence of data packets is not changed.

According to the apparatus provided by the present embodiment of the present disclosure, compared with the prior art, with respect to a DRB that does not support sequential data transmission, the data packets in the target data stream that have been delivered to the original DRB can be transmitted through the original DRB, and the data packets in the target data stream that have not been delivered to the original DRB can be transmitted through the target DRB. In this process, after the receiving end indicates that the DRB is switched, the terminal can switch the DRB in time, so that the communication quality can be ensured. With respect to a DRB that supports sequential data transmission, the data packets in the target data stream can be transmitted in a transmission mode in which sequence of data packets is not changed. Compared with the prior art, the above solution can improve the communication quality while ensuring the data packet transmission sequence for the DRB that supports sequential data transmission.

It should be noted that, when the data transmission apparatus provided by the foregoing embodiment performs data transmission, examples are given by illustrating the individual functional modules. In actual application, the above functions may be performed by different functional modules, that is, the internal structure of the transmitting end or the receiving end may be divided into different functional modules to realize all or part of the above-described functions. Besides, the above embodiments of the data transmission apparatus and the data transmission method provided by the above embodiments belong to the same invention concept, and the specific operating procedures of the apparatus and method may refer to the method embodiments. Therefore, the description thereof will not be repeated herein.

Figure 10:
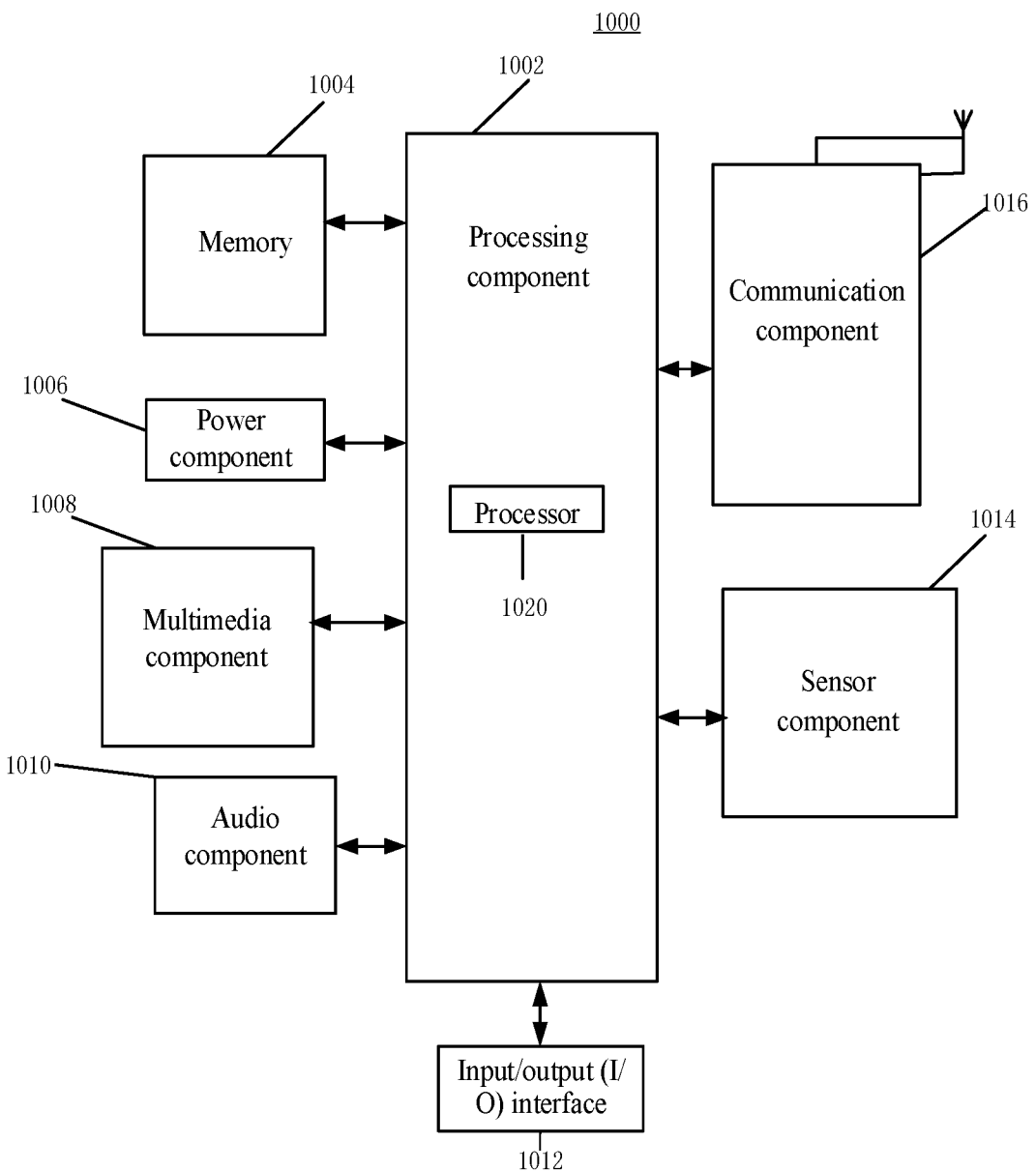
FIG. 10. is a schematic structural diagram of a transmitting end provided by an embodiment of the present disclosure.

A yet another exemplary embodiment of the present disclosure shows a schematic structural diagram of a transmitting end. Referring to FIG. 10, the transmitting end 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the transmitting end 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the transmitting end 1000. Examples of such data include instructions for any applications or methods operated on the transmitting end 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The communication component 1016 is configured to facilitate communication, wired or wirelessly, between the transmitting end 1000 and other devices. The transmitting end 1000 can access a wireless network based on a communication standard, such as WiFi, 2G, or 3G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

The power component 1006 provides power to various components of the terminal device 1000. The power component 1006 may include a power management system, one or more power sources, and any other components associated with the generation, management, and distribution of power in the audio output device 1000.

The multimedia component 1008 includes a screen providing an output interface between the transmitting end 1000 and the user. In some embodiments, the screen may include a liquid crystal display (LCD) and a touch panel (TP). In case that the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1008 includes a front camera and/or a rear camera. The front camera and the rear camera may receive an external multimedia datum while the transmitting end 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC) configured to receive an external audio signal when the audio output device 1000 is in an operation mode, such as a call mode, a recording mode, and a voice recognition mode. The received audio signal may be further stored in the memory 1004 or transmitted via the communication component 1016.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the transmitting end 1000. For instance, the sensor component 1014 may detect an open/closed status of the transmitting end 1000, relative positioning of components, e.g., the display and the keypad, of the transmitting end 1000, a change in position of the transmitting end 1000 or a component of the transmitting end 1000, a presence or absence of user contact with the transmitting end 1000, an orientation or an acceleration/deceleration of the transmitting end 1000, and a change in temperature of the transmitting end 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

In exemplary embodiments, the transmitting end 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a computer readable storage medium including instructions, such as the memory 1004 including instructions, executable by the processor 1020 in the transmitting end 1000, for performing the above-described methods. For example, the computer-readable storage medium may be a ROM (Read-only Memory), a RAM (Random Access Memory), a CD-ROM, a magnetic tape, a floppy disc, an optical data storage device, and the like.

A further embodiment of the present disclosure provides a computer readable storage medium, when instructions in the storage medium are executed by a processor of a terminal, the mobile terminal being enabled to perform:

when a DRB remapping event is detected during a data transmission process of a target data stream, determining whether a switched target DRB supports sequential data transmission or not;

in case that the target DRB does not support sequential data transmission, transmitting, through an original DRB, data packets in the target data stream that have been delivered to the original DRB, and transmitting, through the target DRB, data packets in the target data stream that have not been delivered to the original DRB; and in case that the target DRB supports sequential data transmission, transmitting the data packets in the target data stream in a transmission mode in which sequence of data packets is not changed.

Optionally, the transmitting the data packets in the target data stream in a transmission manner in which sequence of data packets is not changed includes:

stopping delivering the data packets in the target data stream to the original DRB; stopping delivering the data packets in the target data stream to the original DRB; and when it is determined that the data packets in the target data stream that have been delivered to the original DRB are successfully transmitted to a receiving end, transmitting, through the target DRB, data packets in the target data stream that have not been delivered to the original DRB.

Optionally, the transmitting the data packets in the target data stream in a transmission manner in which sequence of data packets is not changed includes:

in a transmission feedback determination mode, receiving acknowledgement information corresponding to the successfully transmitted data packets fed back by the receiving end; determining, according to the acknowledgement information, data packets in the target data stream that have been successfully transmitted to the receiving end; and transmitting, through the target DRB, other data packets in the target data stream other than the data packets that have been successfully transmitted to the receiving end, wherein the transmission feedback determination mode indicates that the receiving end feeds back the acknowledgement information when the data packets are successfully transmitted to the receiving end.

Optionally, the transmitting, through the target DRB, other data packets in the target data stream other than the data packets that have been successfully transmitted to the receiving end includes:

determining, through an RLC layer, data packets in the target data stream that have been delivered to the RLC layer and have not been successfully transmitted to the receiving end;

determining, through a PDCP layer, data packets in the target data stream that have been delivered to the PDCP layer and have not been delivered to the RLC layer; and transmitting, through the target DRB, the data packets that have been delivered to the RLC layer and have not been successfully transmitted to the receiving end, the data packets in the target data stream that have been delivered to the PDCP layer and have not been delivered to the RLC layer and the data packets in the target data stream that have not been delivered to the original DRB.

Optionally, the method further includes:

deleting the data packets in the target data stream in the original DRB that have been delivered to the PDCP layer and have not been delivered to the RLC layer; and deleting the data packets in the target data stream in the original DRB that have been delivered to the RLC layer and have not been successfully transmitted to the receiving end.

Optionally, the transmitting the data packets in the target data stream in a transmission manner in which sequence of data packets is not changed includes:

in a non-transmission feedback determination mode, transmitting, through the target DRB, other data packets in the target data stream other than the data packets that have been transmitted to the receiving end, wherein the non-transmission feedback determination mode indicates that the receiving end does not feed back the acknowledgement information when the data packets are successfully transmitted to the receiving end.

Optionally, the transmitting, through the target DRB, other data packets in the target data stream other than the data packets that have been successfully transmitted to the receiving end includes:

determining, through the RLC layer, data packets in the target data stream that have been delivered to the RLC layer and have not been transmitted to the receiving end;

determining, through the PDCP layer, data packets in the target data stream that have been delivered to the PDCP layer and have not been delivered to the RLC layer; and transmitting, through the target DRB, the data packets that have been delivered to the RLC layer and have not been transmitted to the receiving end, the data packets that have been delivered to the PDCP layer and have not been delivered to the RLC layer and the data packets in the target data stream that have not been delivered to the original DRB.

Optionally, the method further includes:

deleting the data packets in the target data stream in the original DRB that have been delivered to the PDCP layer and have not been delivered to the RLC layer; and deleting the data packets in the original DRB that have been delivered to the RLC layer and have not been transmitted to the receiving end.

Optionally, the method further includes:

transmitting serial numbers of the data packets deleted in the original DRB to the receiving end, such that the original DRB at the receiving end stops waiting for receiving the data packets corresponding to the serial numbers.

Optionally, the transmitting the data packets in the target data stream in a transmission manner in which sequence of data packets is not changed includes:

stopping delivering the data packets in the target data stream to the original DRB;

determining, SDU data packets in the target data stream at the PDCP layer that have not been delivered to the RLC layer; and when it is determined that the data packets in the target data stream that have been delivered to the original DRB other than the SDU data packets are successfully transmitted to the receiving end, transmitting, through the target DRB, the SDU data packets, and the data packets in the target data stream that have not been delivered to the original DRB.

Optionally, whether the DRB remapping event occurs during the data transmission process of the target data stream is detected by the SDAP layer or the RRC layer.

Optionally, the, in case that the target DRB does not support sequential data transmission, transmitting, through the original DRB, data packets in the target data stream that have been delivered to the original DRB, and transmitting, through the target DRB, data packets in the target data stream that have not been delivered to the original DRB includes:

in case that the target DRB does not support sequential data transmission, instructing, through the SDAP layer or the RRC layer, the PDCP layer and the RLC layer to perform a step of: transmitting, through the original DRB, the data packets in the target data stream that have been delivered to the original DRB; and transmitting, through the target DRB, the data packets in the target data stream that have not been delivered to the original DRB;

The, in case that the target DRB supports sequential data transmission, transmitting data packets in the target data stream in a transmission mode in which sequence of data packets is not changed includes:

in case that the target DRB supports the sequential data transmission, instructing, through the SDAP layer or the RRC layer, the PDCP layer and the RLC layer to perform a step of: transmitting the data packets in the target data stream in a transmission mode in which sequence is not changed.

In the process of implementing the present disclosure, the inventors have found at least the following problems.

when a DRB remapping event occurs, the data packet transmission cannot be immediately switched from the original DRB to the target DRB in the above manner, so it is necessary to wait for all the data packets in the target data stream to be transmitted through the original DRB, and then data packets in a new data stream are transmitted through the target DRB. In this case, the terminal cannot immediately follow a remapping indication from the base station, thereby reducing the communication quality.

In addition, some DRBs do not transmit data packets in a sequence that these data packets should arrive. That is, the DRBs do not support sequential data transmission. Even if the sequence of data packets delivered to these DRBs is controlled, these DRBs may not transmit the data packets in sequence. Meanwhile, when the original DRB generally does not support sequential data transmission, the target DRB does not support sequential data transmission either. In this case, the data packets in a new data stream may be transmitted through the target DRB, without the need to wait for the original DRB that does not support sequential data packet transmission to transmit all the data packets in the target data stream. In doing so, the effect of the data packets arriving in sequence is not achieved at the expense of reduced communication quality.

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A data transmission method, comprising:
determining whether a switched target Data Radio Bearer (DRB) supports sequential data transmission or not, when a DRB remapping event is detected during a data transmission process of a target data stream;
transmitting data packets in the target data stream that have been delivered to the original DRB through an original DRB, and transmitting data packets in the target data stream that have not been delivered to the original DRB through the target DRB, in case that the target DRB does not support sequential data transmission; and
transmitting data packets in the target data stream in a transmission mode in which sequence of data packets is not changed, in case that the target DRB supports sequential data transmission.

2. The method according to claim 1, wherein the transmitting the data packets in the target data stream in a transmission mode in which sequence of data packets is not changed comprises:
stopping delivering the data packets in the target data stream to the original DRB; and when it is confirmed that the data packets in the target data stream that have been delivered to the original DRB are successfully transmitted to a receiving end, transmitting data packets in the target data stream that have not been delivered to the original DRB through the target DRB.

3. The method according to claim 1, wherein the transmitting the data packets in the target data stream in a transmission mode in which sequence of data packets is not changed comprises:
in a transmission feedback determination mode, receiving acknowledgement information corresponding to the successfully transmitted data packets fed back by the receiving end; determining data packets in the target data stream that have been successfully transmitted to the receiving end according to the acknowledgement information; and transmitting other data packets in the target data stream other than the data packets that have been successfully transmitted to the receiving end through the target DRB, wherein
the transmission feedback determination mode indicates that the receiving end feeds back the acknowledgement information when the data packets are successfully transmitted to the receiving end.

4. The method according to claim 3, wherein the transmitting other data packets in the target data stream other than the data packets that have been successfully transmitted to the receiving end through the target DRB comprises:
determining data packets in the target data stream that have been delivered to the RLC layer and have not been successfully transmitted to the receiving end through a radio link control (RLC) layer;
determining data packets in the target data stream that have been delivered to the PDCP layer but have not been delivered to the RLC layer through a packet data convergence protocol (PDCP) layer; and
transmitting the data packets that have been delivered to the RLC layer but have not been successfully transmitted to the receiving end, the data packets in the target data stream that have been delivered to the PDCP layer but have not been delivered to the RLC layer and the data packets in the target data stream that have not been delivered to the original DRB through the target DRB.

5. The method according to claim 4, further comprising:
deleting the data packets, in the target data stream in the original DRB, that have been delivered to the PDCP layer but have not been delivered to the RLC layer; and deleting the data packets, in the target data stream in the original DRB, that have been delivered to the RLC layer but have not been successfully transmitted to the receiving end.

6. The method according to claim 5, further comprising:
transmitting serial numbers of the data packets deleted in the original DRB to the receiving end, such that the original DRB at the receiving end stops waiting for receiving the data packets corresponding to the serial numbers.

7. The method according to claim 1, wherein the transmitting data packets in the target data stream in a transmission mode in which sequence of data packets is not changed comprises:
in a non-transmission feedback determination mode, transmitting other data packets in the target data stream other than the data packets that have been transmitted to the receiving end through the target DRB, wherein
the non-transmission feedback determination mode indicates that the receiving end does not feed back the acknowledgement information when the data packets are successfully transmitted to the receiving end.

8. The method according to claim 7, wherein the transmitting other data packets in the target data stream other than the data packets that have been transmitted to the receiving end through the target DRB comprises:
determining data packets in the target data stream that have been delivered to the RLC layer but have not been transmitted to the receiving end through the RLC layer;
determining data packets in the target data stream that have been delivered to the PDCP layer but have not been delivered to the RLC layer through the PDCP layer; and
transmitting the data packets that have been delivered to the RLC layer but have not been transmitted to the receiving end, the data packets that have been delivered to the PDCP layer but have not been delivered to the RLC layer and the data packets in the target data stream that have not been delivered to the original DRB through the target DRB.

9. The method according to claim 8, further comprising:
deleting the data packets in the target data stream in the original DRB that have been delivered to the PDCP layer but have not been delivered to the RLC layer; and deleting the data packets in the original DRB that have been delivered to the RLC layer and have not been transmitted to the receiving end.

10. The method according to claim 1, wherein the transmitting data packets in the target data stream in a transmission mode in which sequence of data packets is not changed comprises:
stopping delivering the data packets in the target data stream to the original DRB;
determining, SDU (Service Data Unit) data packets in the target data stream at the PDCP layer that have not been delivered to the RLC layer; and
transmitting the SDU data packets, and the data packets in the target data stream that have not been delivered to the original DRB through the target DRB when it is determined that the data packets in the target data stream, that have been delivered to the original DRB, other than the SDU data packets are successfully transmitted to the receiving end.

11. The method according to claim 1, wherein whether the DRB remapping event occurs during the data transmission process of the target data stream is detected by the SDAP layer or the RRC layer.

12. The method according to claim 1, wherein the, transmitting the data packets in the target data stream that have been delivered to the original DRB through original DRB, and transmitting data packets in the target data stream that have not been delivered to the original DRB through the target DRB in case that the target DRB does not support sequential data transmission comprises:
   instructing the PDCP layer and the RLC layer through the SDAP layer or the RRC layer to perform a step of: transmitting the data packets in the target data stream that have been delivered to the original DRB through the original DRB; and transmitting the data packets in the target data stream that have not been delivered to the original DRB through the target DRB, in case that the target DRB does not support sequential data transmission;
   the transmitting data packets in the target data stream in a transmission mode in which sequence of data packets is not changed in case that the target DRB supports sequential data transmission comprises:
   instructing the PDCP layer and the RLC layer through the SDAP layer or the RRC layer to perform a step of: transmitting the data packets in the target data stream in a transmission mode in which sequence of data packets is not changed in case that the target DRB supports sequential data transmission.

13. A terminal, comprising at least one processor and a memory that stores at least one instruction, at least one program, a code set or an instruction set thereon, wherein the at least one instruction, the at least one program, the code set or the instruction set is loaded and executed by the processor to implement following steps: determining whether a switched target Data Radio Bearer (DRB) supports sequential data transmission or not, when a DRB remapping event is detected during a data transmission process of a target data stream;
   transmitting data packets, in the target data stream, that have been delivered to the original DRB through an original DRB, and transmitting data packets, in the target data stream, that have not been delivered to the original DRB through the target DRB, in case that the target DRB does not support sequential data transmission; and
   transmitting data packets, in the target data stream in a transmission mode in which sequence of data packets is not changed, in case that the target DRB supports sequential data transmission.

14. The terminal according to claim 13, wherein the transmitting the data packets in the target data stream in a transmission mode in which sequence of data packets is not changed comprises:
   stopping delivering the data packets in the target data stream to the original DRB; and when it is confirmed that the data packets, in the target data stream, that have been delivered to the original DRB are successfully transmitted to a receiving end, transmitting data packets, in the target data stream, that have not been delivered to the original DRB through the target DRB.

15. The terminal according to claim 13, wherein the transmitting the data packets in the target data stream in a transmission mode in which sequence of data packets is not changed comprises:
   receiving acknowledgement information corresponding to the successfully transmitted data packets fed back by the receiving end; determining data packets, in the target data stream, that have been successfully transmitted to the receiving end according to the acknowledgement information; and transmitting other data packets, in the target data stream, other than the data packets that have been successfully transmitted to the receiving end through the target DRB, in a transmission feedback determination mode, wherein
   the transmission feedback determination mode indicates that the receiving end feeds back the acknowledgement information when the data packets are successfully transmitted to the receiving end.

16. The terminal according to claim 15, wherein the transmitting other data packets in the target data stream other than the data packets that have been successfully transmitted to the receiving end through the target DRB comprises:
   determining data packets, in the target data stream, that have been delivered to the RLC layer but have not been successfully transmitted to the receiving end through a radio link control (RLC) layer;
   determining data packets, in the target data stream, that have been delivered to the PDCP layer but have not been delivered to the RLC layer through a packet data convergence protocol (PDCP) layer; and
   transmitting the data packets that have been delivered to the RLC layer but have not been successfully transmitted to the receiving end, the data packets, in the target data stream, that have been delivered to the PDCP layer but have not been delivered to the RLC layer and the data packets, in the target data stream, that have not been delivered to the original DRB through the target DRB.

17. The terminal according to claim 16, further comprising:
   deleting the data packets, in the target data stream in the original DRB, that have been delivered to the PDCP layer but have not been delivered to the RLC layer; and
   deleting the data packets, in the target data stream in the original DRB, that have been delivered to the RLC layer but have not been successfully transmitted to the receiving end.

18. The terminal according to claim 13, wherein the transmitting data packets in the target data stream in a transmission mode in which sequence of data packets is not changed comprises:
   transmitting other data packets in the target data stream other than the data packets that have been transmitted to the receiving end through the target DRB in a non-transmission feedback determination mode, wherein
   the non-transmission feedback determination mode indicates that the receiving end does not feed back the acknowledgement information when the data packets are successfully transmitted to the receiving end.

19. The terminal according to claim 18, wherein the transmitting other data packets in the target data stream other than the data packets that have been transmitted to the receiving end through the target DRB comprises:
   determining data packets, in the target data stream, that have been delivered to the RLC layer but have not been transmitted to the receiving end through the RLC layer;

determining data packets, in the target data stream, that have been delivered to the PDCP layer but have not been delivered to the RLC layer through the PDCP layer; and transmitting the data packets that have been delivered to the RLC layer but have not been transmitted to the receiving end, the data packets that have been delivered to the PDCP layer but have not been delivered to the RLC layer and the data packets in the target data stream that have not been delivered to the original DRB through the target DRB.

20. A non-transitory computer readable storage medium, wherein at least one instruction, at least one program, a code set or an instruction set is stored in the storage medium, and is loaded and executed by at least one processor to implement following steps:

determining whether a switched target Data Radio Bearer (DRB) supports sequential data transmission or not, when a DRB remapping event is detected during a data transmission process of a target data stream;

transmitting data packets, in the target data stream, that have been delivered to the original DRB through an original DRB, and transmitting data packets, in the target data stream, that have not been delivered to the original DRB through the target DRB, in case that the target DRB does not support sequential data transmission; and transmitting data packets in the target data stream in a transmission mode in which sequence of data packets is not changed, in case that the target DRB supports sequential data transmission.

* * * * *